(12) United States Patent
Smith et al.

(10) Patent No.: US 6,551,570 B1
(45) Date of Patent: Apr. 22, 2003

(54) HYDROGEN SULFIDE REMOVAL PROCESS

(75) Inventors: James W. Smith, Toronto (CA); Silvano Meffe, Toronto (CA); Peter S. Walton, Etobicoke (CA); David T. R. Ellenor, Pickering (CA)

(73) Assignee: Apollo Evironmental Systems Corp., North York (CA)

( * ) Notice: Subject to any disclaimer, the term of this patent is extended or adjusted under 35 U.S.C. 154(b) by 0 days.

(21) Appl. No.: 09/509,773

(22) PCT Filed: Nov. 12, 1998

(86) PCT No.: PCT/CA98/01051

§ 371 (c)(1),
(2), (4) Date: May 30, 2000

(87) PCT Pub. No.: WO99/24531

PCT Pub. Date: May 20, 1999

Related U.S. Application Data
(60) Provisional application No. 60/065,287, filed on Nov. 12, 1997.

(51) Int. Cl.⁷ ................................................ C01B 17/04
(52) U.S. Cl. .................. 423/574.1; 423/575; 423/576.2
(58) Field of Search .............................. 423/374.1, 575, 423/576.2

(56) References Cited

U.S. PATENT DOCUMENTS

| | | | |
|---|---|---|---|
| 3,933,994 A | * | 1/1976 | Rounds ....................... 423/575 |
| 4,592,905 A | * | 6/1986 | Plummer et al. ........ 423/573 R |
| 5,389,351 A | * | 2/1995 | Hasebe et al. ............ 423/242.1 |
| 5,556,606 A | * | 9/1996 | Khanmamedov ........... 423/228 |
| 5,705,135 A | * | 1/1998 | Deberry et al. ............. 423/224 |

FOREIGN PATENT DOCUMENTS

| | | | |
|---|---|---|---|
| WO | WO 86/02628 | * | 8/1986 |
| WO | WO 97/18028 | * | 5/1997 |

* cited by examiner

Primary Examiner—Stanley S. Silverman
Assistant Examiner—Timothy C Vanoy
(74) Attorney, Agent, or Firm—Sim & McBurney

(57) ABSTRACT

Hydrogen sulfide is removed from gas streams by reaction with sulfur dioxide to produce sulfur. The reaction is effected in a reaction medium comprising a non-aqueous Lewis base with a $pK_b$ value of about 6 to about 11. The reaction medium possesses a specific combination of properties:

a) absorbs sulfur dioxide and reacts chemically therewith to form a reaction product;
b) absorbs hydrogen sulfide;
c) removes the hydrogen sulfide from the gas stream through contact of the gas stream with the reaction medium in the presence of free sulfur dioxide, and/or the reaction product;
d) acts as a catalyst for the overall reaction of the hydrogen sulfide with sulfur dioxide to produce sulfur; and
e) has the capacity to absorb sulfur dioxide in sufficient quantity to remove substantially all the hydrogen sulfide from the gas stream, notwithstanding short term variations in the stoichiometric balance between the hydrogen sulfide and the sulfur dioxide in the reaction medium.

13 Claims, 2 Drawing Sheets

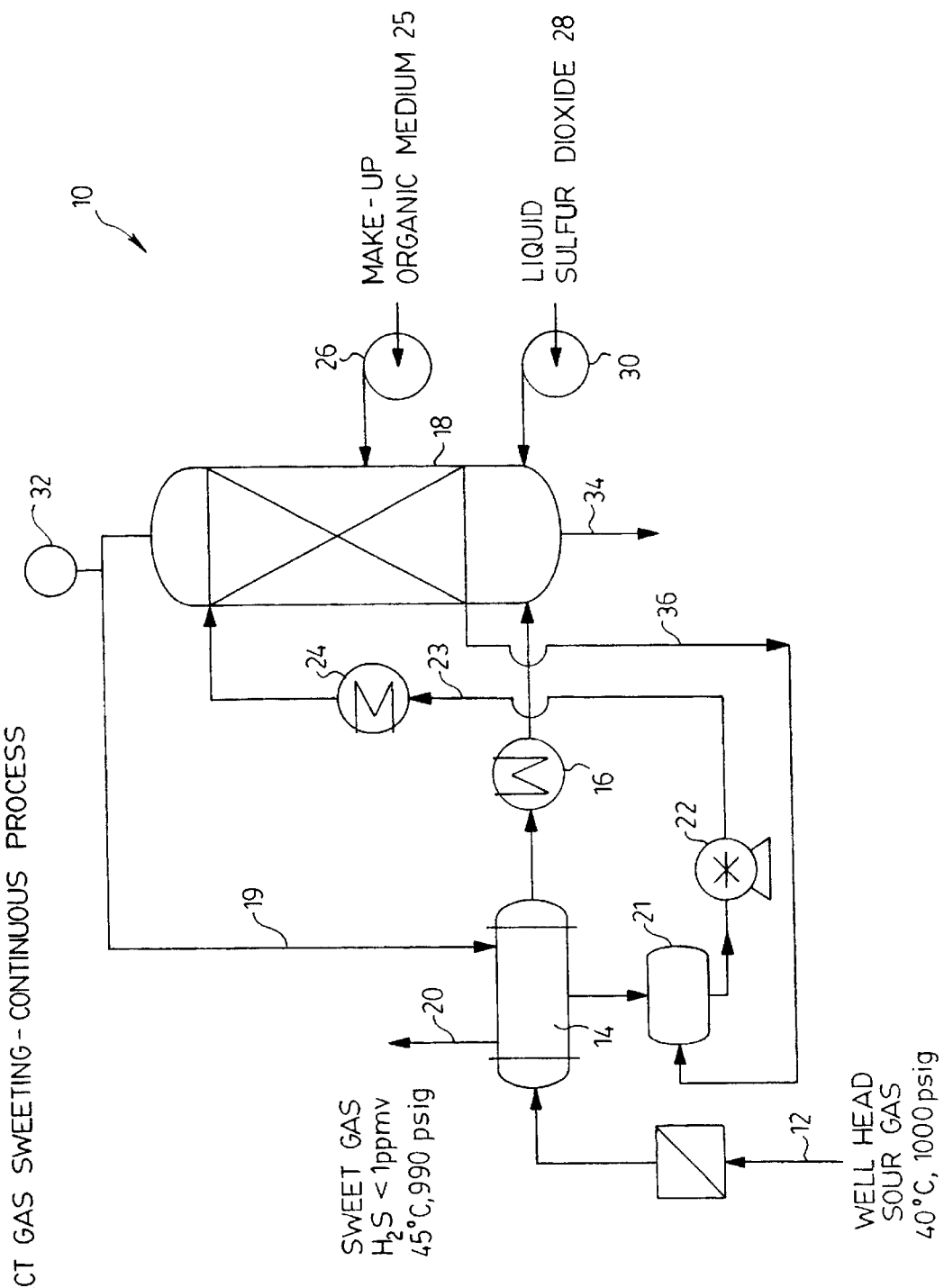
FIG.1. DIRECT GAS SWEETING-CONTINUOUS PROCESS

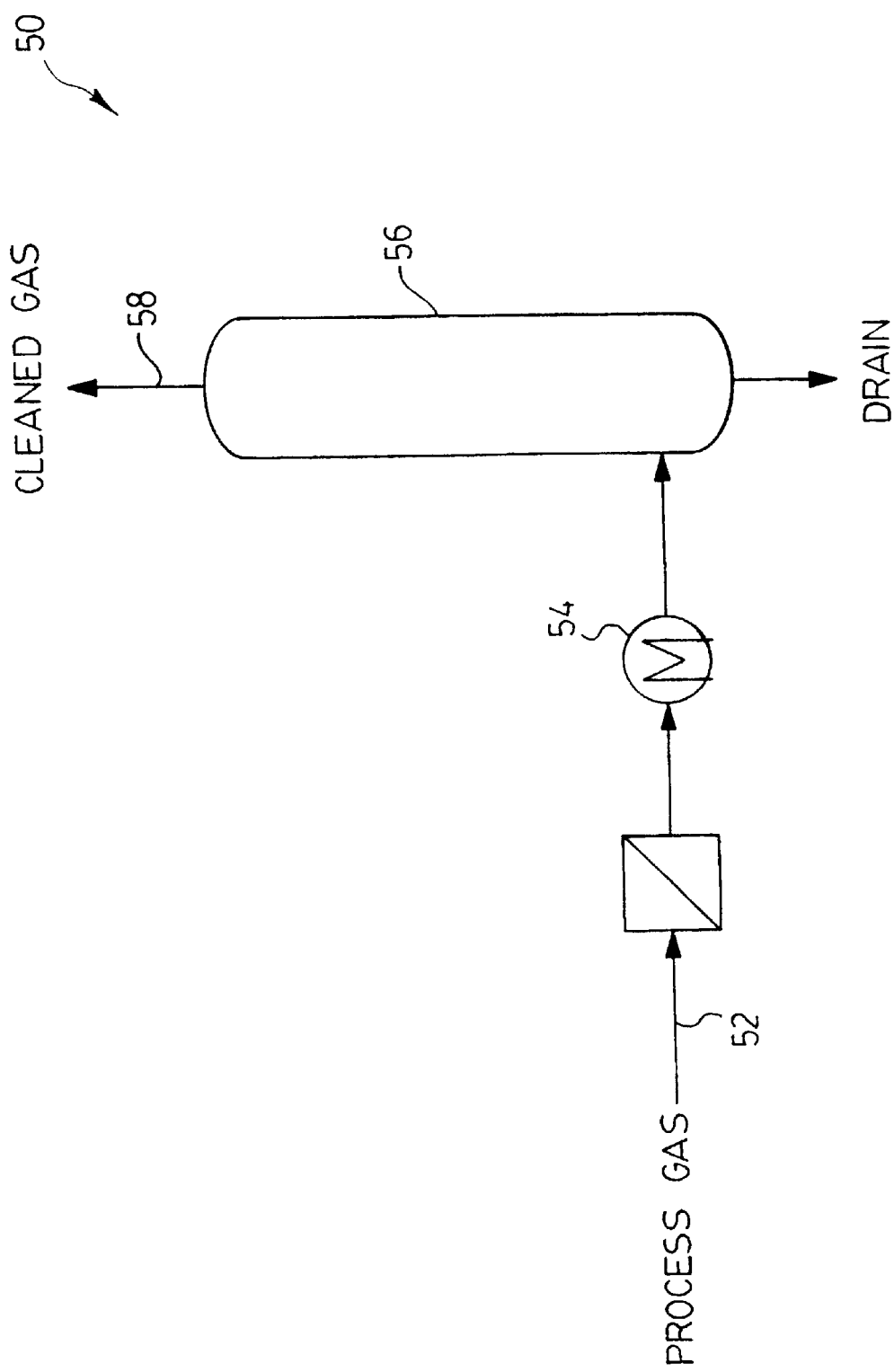
FIG.2. BATCH GAS SCAVENGING PROCESS

HYDROGEN SULFIDE REMOVAL PROCESS

This application is a national phase application under 35 U.S.C. 371 of PCT/CA98/01051 filed Nov. 12, 1998 and claims priority under 35 USC 119(e) from U.S. Provisional Patent Application No. 60/065,287 filed Nov. 12, 1997.

FIELD OF INVENTION

The present invention relates to the removal of hydrogen sulfide from gas streams using a reaction medium comprising non-aqueous Lewis bases.

BACKGROUND TO THE INVENTION

Many reservoirs of natural gas contain hydrogen sulfide and carbon dioxide which are acid gases which can be extremely corrosive when combined with each other and water. Natural gas containing such acid or sour gases must be purified (or "sweetened") to remove or decrease the concentration of such gases prior to the purified natural gas ("sweet gas") being forwarded to consumer, industrial and other markets.

The most commonly-practised process technology for acid gas removal is the absorption of the acid gases from the natural gas stream by a regenerable absorbing solution in a gas processing plant. In such procedures, a regenerable absorbing solution is passed in countercurrent contact with the natural gas stream to absorb the $H_2S$ and $CO_2$, as well as other sulfur compounds, from the natural gas stream, thereby reducing their concentration in the natural gas stream and purifying the natural gas stream.

The acid gas laden solution then is regenerated by steam stripping at elevated temperature and the regenerated solution is cooled and recirculated back to the natural gas contacting stage. Acid gases stripped from the solution in the regeneration step are vented from the gas processing plant for further processing, including, in some case, incineration to sulfur dioxide. The present invention is concerned with a manner of processing sour natural gas streams.

Chemicals that are commonly employed in such procedures include amines, esters and similar regenerable materials in which the acid gases may be absorbed. The most commonly-employed amines for this procedure include monoethanolamine (MEA), diethanolamine (DEA) and methyldiethanolamine (MDEA).

The present invention provides novel procedures for treatment of hydrogen sulfide-containing gas streams. As described in more detail below, the process of the invention includes a step of reacting hydrogen sulfide and sulfur dioxide to form sulfur (sometimes termed the Claus reaction) in a reaction medium comprising a non-aqueous Lewis base, preferably quinoline. The processes described herein are applicable to other gas streams which contain hydrogen sulfide, including Claus process tail gas streams and industrial flue gas streams.

SUMMARY OF THE INVENTION

In accordance with the present invention, a reaction medium comprising non-aqueous Lewis bases, having a $pK_b$ value of about 6 to about 11, preferably about 8 to about 10, particularly quinoline, are used to remove hydrogen sulfide from gas streams, particularly in the sweetening of sour natural gas streams by effecting reaction between hydrogen sulfide and sulfur dioxide in the reaction medium. The reaction of hydrogen sulfide with sulfur dioxide, which may be in the form of a reaction product with the Lewis base, proceeds in accordance with the equation:

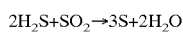

$$2H_2S+SO_2 \rightarrow 3S+2H_2O$$

known as the Claus reaction.

It is well known that sulfur dioxide is soluble in many amines, including quinoline, forming an equi-molar solid reaction product, itself soluble in quinoline and quinoline-water mixtures.

The inventors herein use the reaction product in an original manner to provide improved procedures for removing hydrogen sulfide from gas streams. The present invention uses a reaction comprising a Lewis base which has $pK_b$ values from about 6 to about 11, preferably about 8 to about 10. Although strong Lewis bases, ($pK_b$ less than about 6) tend to react irreversibly with sulfur dioxide, preventing the Claus reaction from occurring, weaker Lewis bases ($pK_b$ greater than about 11) do not appear to catalyze the Claus reaction. The Lewis bases of intermediate basicity ($pK_b$ from about 6 to about 11), as used herein, react reversibly with sulfur dioxide and catalyze the Claus reaction. Quinoline ($pK_b$ 9) is the preferred amine but other amines with the required $pK_b$ values can be used, such as 2,4,6-trimethyl pyridine ($pK_b$ 7).

Accordingly, in one aspect of the present invention, there is provided a process for the removal of hydrogen sulfide from a gas stream by reaction with sulfur dioxide, which comprises effecting the reaction in a reaction medium comprising a non-aqueous Lewis base with a $pK_b$ value in the range of about 6 to about 11 and which reaction medium:

a) absorbs sulfur dioxide and reacts chemically therewith to form a reaction product;

b) absorbs hydrogen sulfide;

c) removes the hydrogen sulfide from the gas stream through contact of the gas stream with the reaction medium in the presence of free sulfur dioxide, and/or the reaction product;

d) acts as a catalyst for the overall reaction of the hydrogen sulfide with sulfur dioxide to produce sulfur; and (e) has the capacity to absorb sulfur dioxide in sufficient quantity to remove substantially all the hydrogen sulfide from the gas stream, notwithstanding short term variations in the stoichiometric balance between the hydrogen sulfide and the sulfur dioxide in the reaction medium.

The reaction medium may consist essentially of the non-aqueous Lewis base or may further comprise a miscible diluent of vapour pressure below about 0.39 psi at a temperature of about 120° C.

The process of hydrogen sulfide removal provided herein may be effected in a manner in which sulfur dioxide is continuously absorbed by the reaction medium to react with hydrogen sulfide in the gas stream at a temperature of about 120° to about 155° C., preferably about 120° to about 130° C., to produce liquid sulfur, and the liquid sulfur so produced is continuously removed from the process.

The latter procedure is particularly useful in a natural gas sweetening operation or for the processing of a hydrogen sulfide-containing gas stream where a continuous operation is required.

The process of hydrogen sulfide removal provided herein may be effected in a manner in which the gas stream is so contacted, intermittently or continuously, with a body of the reaction medium to react the hydrogen sulfide with sulfide dioxide in the reaction product to form sulfur until the reaction medium is depleted of its capacity to react with hydrogen sulfide.

The latter procedure is particularly useful for scavenging operations to remove lesser amounts of hydrogen sulfide on an intermittent operational basis from gas streams having a variety of sources. The procedure may be operated at a temperature above or below the melting point of sulfur and down to the solidification point of the reaction medium. The sulfur usually is permitted to accumulate in the body of the reaction medium until the reaction medium is depleted.

When the reaction medium becomes depleted of the ability to react with hydrogen sulfide, which may be detected by any conventional sensing device, the reaction medium is regenerated. Since regeneration may take a variety of forms, including replacement of the depleted reaction medium by a fresh charge of the reaction medium or a charge of reaction medium regenerated from a previous batch. Regeneration may be effected by reforming the reaction product of the sulfur dioxide and the non-aqueous Lewis base. Sulfur may be removed intermittently as desired from the reaction medium.

GENERAL DESCRIPTION OF THE INVENTION

In one specific aspect of the present invention, there is provided a continuous process for the removal of hydrogen sulfide from a gas stream, which comprises contacting a reaction medium comprising a non-aqueous Lewis base having a $pK_b$ value of about 6 to about 11 having the capacity to absorb sulfur dioxide in sufficient quantity to remove substantially all the hydrogen sulfide from the gas stream, notwithstanding short term variations in the stoichiometric balance between the hydrogen sulfide and the sulfur dioxide in the reaction medium with the gas stream in the presence of sulfur dioxide in the reaction medium to react with the hydrogen sulfide at a temperature above the melting point of sulfur to form liquid sulfur, in accordance with the equation:

$$2H_2S+SO_2 \rightarrow 3S+2H_2O$$

in a upper region of a reactor, accumulating liquid sulfur from the reaction as a layer in a lower region of the reactor below the reaction medium, venting a hydrogen sulfide depleted gas stream from the reactor, and removing liquid sulfur from the layer thereof.

In this procedure, the sulfur dioxide and/or the gas stream may be passed upwardly through the layer of liquid sulfur to remove dissolved components from the liquid sulfur and then through the reaction medium to produce therein the reaction product for reaction with the hydrogen sulfide.

One specific embodiment of the procedure is carried out on a sour natural gas stream containing the hydrogen sulfide. In this specific procedure, the sour natural gas stream first is heated to a temperature at least close to and optionally above the melting point of the sulfur and then is passed to the reactor. The heated sour natural gas stream then is dispersed in the layer of liquid sulfur and is permitted to pass upwardly through the layer of liquid sulfur and into direct contact with the reaction medium containing sulfur dioxide in at least sufficient quantity to convert substantially all the hydrogen sulfide in the gas stream to sulfur.

The resultant sweetened gas stream is removed from the reactor as the vented gas stream. The sweetened gas stream is cooled to remove condensables therefrom and the resulting cooled sweetened gas stream is removed as the product of the process. The heating of the sour gas stream to the temperature may be effected, at least in part, by passing the source in heat exchange relationship with the removed sweetened gas stream, which thereby effects the cooling of the removed sweetened gas stream.

The condensables may be collected and comprise condensed non-aqueous Lewis base, associated compounds and dissolved sulfur and the collected condensables are recycled to the reactor. In addition, the reaction medium may be recycled within the reactor by blending a stream of the reaction medium from the reactor with the collected condensables and recycling the blend to the reactor. The blend may be heated prior to the passage to the reactor. The combined heating of the sour natural gas stream and the heating of the blend may provide the heating required to maintain the reaction temperature in the desired range above the melting point of sulfur.

In another specific aspect of the present invention, there is provided a process for the removal of hydrogen sulfide from a gas stream, which comprises passing the gas stream into a body of regenerable reaction medium comprising a non-aqueous Lewis base having a $pK_b$ value of about 6 to about 11 having the capacity to absorb sulfur dioxide in sufficient quantity to remove substantially all the hydrogen sulfide from the gas stream, notwithstanding short term variations in the stoichiometric balance between the hydrogen sulfide and the sulfur dioxide in the reaction medium, and containing a reaction product of sulfur dioxide and the non-aqueous Lewis base to absorb the hydrogen sulfide from the gas stream and to react the absorbed hydrogen sulfide with sulfur dioxide from the reaction product in accordance with the equation:

$$2H_2S+SO_2 \rightarrow 3S+2H_2O$$

to form product sulfur in a reactor, venting a hydrogen sulfide depleted gas stream from an upper portion of the reactor above the reaction medium and permitting the product sulfur to settle to a lower portion of the reactor.

The hydrogen sulfide-containing gas stream may be passed into the body of reaction medium by a gas distributor within the body of reaction medium to distribute the gas stream in the form of small bubbles adjacent to a lower end of the reactor. The procedure may be operated as a continuous process or in intermittent manner and is particularly useful for scavenging operations.

Exhaustion of the capacity of the body of reaction medium to absorb and convert hydrogen sulfide to sulfur may be detected in any convenient manner and the exhausted reaction medium then is replaced with regenerated reaction medium containing the reaction product, or regenerated by the addition of sulfur dioxide. Sulfur may be removed from the reaction medium as required.

BRIEF DESCRIPTION OF DRAWINGS

FIG. 1 is a schematic flow sheet of a continuous hydrogen sulfide removal process for sweetening a natural gas stream containing hydrogen sulfide under process conditions of operation which may vary widely; and FIG. 2 is a schematic flow sheet of a batch scavenging process for the removal of hydrogen sulfide from a gas stream containing small amounts of hydrogen sulfide.

DESCRIPTION OF PREFERRED EMBODIMENTS

The applicants provide herein two distinct embodiments of the process for removal of hydrogen sulfide, described in more detail below in relation to FIGS. 1 and 2. In one embodiment of the invention (FIG. 1), there is provided a continuous process for sweetening a natural gas stream containing hydrogen sulfide. In a second embodiment of the invention (FIG. 2), there is provided a batch process for sweetening natural gas, solution gas or other hydrogen sulfide contaminated industrial gas stream which utilizes regenerable quinoline-sulfur dioxide solutions.

A. Embodiment of FIG. 1

Referring to FIG. 1, there is shown therein a single vessel continuous hydrogen sulfide removal process 10 which is carried out on a sour natural gas stream. Typical well-head gas conditions, concentration, temperature and pressure are given, but the process is applicable to a wide range of process conditions, as will be appreciated by those skilled in the art.

Natural gas flows from a well-head 12 through standard process equipment (not shown) to a heat exchanger 14, wherein it is heated to, say, about 116° C., and from there then flows to a gas heater 16, possibly gas fired, which further increases the gas temperature to, say, about 121° C., and preferably high enough to maintain the temperature of a reactor/contactor 18 to which the heated gas stream is fed above the melting point of sulfur to allow sulfur to be in a molten condition. The gas stream enters reactor/contactor 18 through a check valve, not shown, which prevents the back-flow of gas and the contents of reactor/contactor 18.

In the reactor/contactor 18, which may be a bubble-column or packed column, the gas stream first is dispersed through a layer of liquid sulfur, thereby removing dissolved components from the sulfur. The gas then flows in direct contact with a reaction medium comprising quinoline which contains sufficient sulfur dioxide to convert the hydrogen sulfide in the gas to sulfur by the Claus reaction referred to above.

The sweetened gas then passes by line 19 in counter current flow to the inlet gas through the shell side of heat exchanger 14, where the gas temperature is reduced to, say, about 5° C. above the well-head temperature. Alternatively, where larger quantities of water are involved, a quinoline-water separation may be effected. These procedures ensure that water produced in the Claus reaction is removed. This step is important, since it has been found according to the data of Table 1, that dissolved water has a deleterious effect of the efficacy of the liquid Claus reaction in the reaction medium. Sweet gas, which may have the indicated parameters, is discharged from the heat exchanger 14 by line 20.

Condensate formed in the shell side of the heat exchanger 14, which consists of quinoline, associated compounds and dissolved sulfur (which is moderately soluble in quinoline), and in some applications also including water, flows into tank 21. This step carries out the important function of preventing the deposition of condensed sulfur vapour on the heat exchanger tubes. Pump 22 then transfers the condensate back by the line to the reactor/contactor 18 through a check valve, not shown, which prevents back-flow. The recycle stream 23 may be heated by heat exchanger 24 to provide heat to the reactor/contactor 18 along with the heated gas stream heated in heat exchanger 16. The pump 22 operates continuously at a constant rate.

Reaction medium make up 25 is required, since the exiting gas is saturated at a temperature of, say, 45° C. In view of this, it is desirable to operate with as low an approach temperature in heat exchanger 14 as economically feasible. Nevertheless, the vapour pressure of quinoline at temperatures less than 50° C. is only 0.00145 psi, and, at a total pressure of about 1000 psi, this corresponds to a concentration of 1.45 ppm(v). At a gas flow rate of 5 MMSCFD, the make up requirement for quinoline is less than 10 kg/day.

Make up reaction medium 25 may be pumped from a tank through a check valve (not shown) by a level controlled pump 26 between appropriate levels of reaction medium in the reactor/contactor 18.

Liquid sulfur dioxide 28 is pumped from a rail car or other source by pump 30. The pump is turned on when hydrogen sulfide is detected by a sensor 32, normally at a concentration less than about 1 ppm. The presence of $H_2S$ in the outlet stream indicates that $SO_2$ has become depleted in the reactor/contactor 18 and hence indicates the necessity for adding fresh sulfur dioxide reactant. A pre-determined volume of sulfur dioxide then is injected into the reactor/contactor 18. Because of the high solubility of sulfur dioxide in quinoline, sulfur dioxide does not break through, even at relatively high loadings.

Sulfur formed as a molten mass in the reactor/contactor 18 is discharged through a level-controlled valve, (not shown), intermittently as required, by line 34. Much of the quinoline dissolved in the sulfur is purged by the gas stream and the sulfur dioxide stream, so that little, if any, quinoline is lost from the system with liquid sulfur.

Reaction medium may be removed from a lower region of the reactor/contactor 18 by line 36 and recycled to the tank 21 to blend with the condensed materials therein and forms part of the stream recycled to the reactor/contactor 18 in line 23.

Although the embodiment discussed above with reference to FIG. 1 is preferably operated at temperatures in the reactor/contactor 18 of greater than 120° C., the reaction may be carried out at lower temperatures, and up to about 155° C., although vaporization of quinoline (or other non-aqueous Lewis base) is at a much higher rate at the higher temperatures due to the increase in vapour pressure. In general, the Claus reaction process in the reactor/contactor 18 is carried out at a temperature of about 120° to about 155° C., preferably about 120° to about 130° C.

B. Embodiment of FIG. 2

Referring to FIG. 2, there is shown therein a batch scavenging process 50 which is carried out on a variety of hydrogen sulfide-containing gas streams to remove residual amounts of hydrogen sulfide in a regenerable system.

Typically, known batch scavenging processes are either regenerable or non-regenerable. A number of commercial processes rely on regenerable oxides, such as zinc oxide, which are often returned to the supplier for a credit. Such systems are often used when the residual hydrogen sulfide must be less than a few ppb(v) and are very expensive. Other systems utilize a non-regenerable absorbent, which can be a solution of chemicals, such as aqueous sodium hydroxide or sodium hypochlorite. The cost of such processes can be very high, and disposal of the spent chemical solutions can be expensive and difficult. The commercial Sulfatreat process utilizes a non-regenerable iron compound. Like all non-regenerable batch scavenging processes, operating costs for this system can be very high when there is a substantial amount of hydrogen sulfide in the gas. The main economic advantage of the process according to this embodiment of the invention lies in the high capacity for hydrogen sulfide relative to other processes, and the simplicity and ease of regeneration of the absorbing solution, which, once again, relies on the liquid Claus reaction in reaction media comprising non-aqueous Lewis bases, such as quinoline.

Referring now to FIG. 2, an industrial gas stream 52 which may be natural gas, solution gas or other industrial gas, is passed through a heater 54, which is optional. A heater may be necessary if the gas stream is saturated and/or contains water mist, since dissolved water inhibits the process in quinoline, as mentioned above.

The optionally-heated gas flows through a shut-off valve, (not shown) to a gas distributor within an absorption/ reaction vessel 56. The gas is distributed in the form of small bubbles by a distributor plate in the lower part of the vessel 56. Vessel 56 contains a solution of sulfur dioxide and a reaction product of sulfur dioxide and a non-aqueous Lewis base, preferably quinoline, in the reaction medium. Hydrogen sulfide is absorbed by the solution and reacts with the sulfur dioxide contained therein, producing sulfur and water. The form in which the sulfur is obtained depends on the temperature of operation of the process. The sulfur agglomerates and settles to the bottom of the vessel. The treated gas, depleted of hydrogen sulfide, flows through a mist eliminator (not shown) and through shut-off valve (not shown) as cleaned gas 58.

The contact of the gas stream with the reaction medium also removes particulate matter, including condensed vapours, which may remain in solution or may be adsorbed on the sulfur. When the system is exhausted of sulfur dioxide reactant, which may be detected in any suitable manner, such as a hydrogen sulfide detector 32 as used in FIG. 1, the entire equipment, including vessel 56 and associated valves, may be taken out of service, and replaced by an identical, freshly regenerated system. The exhausted system may then be capped and sent to a central regeneration facility. Alternatively, the contents may be removed from the vessel 56 and replaced by a freshly regenerated solution, or may be regenerated in situ.

At the regeneration facility, sulfur and the reaction medium may be separated by conventional technology, and, if desired, the sulfur can be further processed to remove other impurities.

The economic advantages of this process are substantial, having regard to its simplicity, its absorption capacity for sulfur dioxide, its fully regenerable chemistry and low reagent losses.

The results obtained at ambient temperature and atmospheric pressure are summarized in the following Tables I and II.

TABLE I

Effect of Water on the Kinetics of the Claus Reaction quinoline

| VARIABLE | CONTROL | EXPT. 1 | EXPT. 2 |
|---|---|---|---|
| Quinoline (Vol %) | 100 | 95 | 80 |
| Water (Vol %) | — | 5 | 20 |
| $H_2S$ In (Vol %) | 2.37 | 2.18 | 2.78 |
| $SO_2$ In (Vol %) | 1.46 | 0.91 | 1.51 |
| $H_2S$ Out (Vol %) | 0.1 | 0.39 | 1.14 |
| $SO_2$ Out (Vol %) | 0.0 | 0.0 | 0.0 |
| Removal Efficiency $H_2S$ (%) | 96 | 82 | 59 |
| Removal Efficiency $SO_2$ (%) | 100 | 100 | 100 |

With respect to the results set forth in Table I, it can be seen that the presence of 5 volume percent of water in the quinoline does not affect the reaction kinetics or the stoichiometry of the $H^2S$ removal, but that the presence of 20 volume percent of water dramatically reduces the $H^2S$ removal, probably as a result of SO2 reacting with the water at the same time as with the $H^2S$.

TABLE II

| TEST | LIQUID PHASE (0.400 $DM^3$) | FEED GAS RATE ($DM^3$/MIN) | FEED [$H_2S$] (VOL %) | FEED [$SO_2$] (VOL %) | FEED [$CO_2$] (VOL %) | FEED [$N_2$] (VOL %) | $H_2S$ REMOVAL (%) | $SO_2$ REMOVAL (%) | STOICHIOMETRY |
|---|---|---|---|---|---|---|---|---|---|
| 1 | quinoline | 0.50 | 3.26 | 1.43 | 0 | balance | 100 | 99.3 | 2.3 |
| 2 | 2,4,6-trimethyl pyridine | 0.50 | 2.74 | 1.24 | 0 | balance | 100 | 92.7 | 2.4 |
| 3 | 2,4,6-trimethyl pyridine | 0.50 | 1.13 | 0.82 | 0 | balance | 100 | 79.3 | 1.7 |
| 4 | quinoline | 0.50 | 1.44 | 0.68 | 41 | balance | 81 | 100 | 1.7 |
| 5 | quinoline | 0.50 | 0.58 | 0.22 | 27 | balance | 69 | 100 | 1.8 |
| 6 | quinoline | 0.50 | 2.69 | 1.29 | 0 | balance | 100 | 99.4 | 2.1 |
| 7 | quinoline | 1.0 | 2.03 | 1.48 | 0 | balance | 100 | 98.7 | 1.4 |

EXAMPLES

Example 1

This Example illustrates the removal of hydrogen sulfide and sulfur dioxide from gas streams using non-aqueous Lewis bases.

Experiments were performed in a glass sparged vessel with an inside diameter of 45 mm and a height of 380 mm. A 6 mm diameter tube extending inside the vessel from the top down to 30 mm from the vessel bottom was employed for introduction of the gas mixtures into the liquid content of the vessel. Attached to the bottom of this glass tube was a frit that dispersed the gas phase as fine bubbles into the liquid phase. A 6 mm diameter glass tube located on the top perimeter of the vessel permitted venting of the contact gases.

With respect to the results set forth in Table II, the following observations can be made:
(i) the results of tests 1, 2, 3, 6, and 7 indicate that complete removal of hydrogen sulfide can be achieved in the reaction medium;
(ii) the results of test 1, 2, and 6 also indicate (for stoichiometries greater than 2:1) some absorptive capacity of the reaction medium for hydrogen sulfide;
(iii) the results of tests 3, 4, 5, and 7 indicate (for stoichiometries greater than 2:1) a significant absorptive capacity of the reaction medium for sulfur dioxide;
(iv) the results of tests 4 and 5 indicate that the presence of carbon dioxide in the feed gas may inhibit the absorption of hydrogen sulfide.

What we claim is:
1. A process for the removal of hydrogen sulfide from a gas stream by reaction with sulfur dioxide in a single stage, which comprises effecting said reaction in a reaction medium comprising a single non-aqueous Lewis base which is quinoline and which reaction medium:
  a) absorbs sulfur dioxide and reacts chemically therewith to form a reaction product;
  b) absorbs hydrogen sulfide;
  c) removes said hydrogen sulfide from said gas stream through contact of said gas stream with said reaction medium in the presence of free sulfur dioxide, and/or said reaction product;
  d) acts as a catalyst for the overall reaction of said hydrogen sulfide with sulfur dioxide to produce sulfur; and
  (e) has the capacity to absorb sulfur dioxide in sufficient quantity to remove substantially all said hydrogen sulfide from said gas stream, notwithstanding variations in the stoichiometric balance between said hydrogen sulfide and said sulfur dioxide in said reaction medium, wherein said gas stream is contacted intermittently or continuously with a body of said reaction medium to react the hydrogen sulfide with sulfur dioxide in said reaction product to form sulfur until the reaction medium is depleted of the capacity to react with said hydrogen sulfide and wherein said depleted reaction medium is regenerated.

2. The process of claim 1 wherein said regeneration effected by addition of sulfur dioxide.

3. A continuous process for the removal of hydrogen sulfide from a gas stream, which comprises:
  contacting a reaction medium comprising a single non-aqueous Lewis base which is quinoline and having the capacity to absorb sulfur dioxide in sufficient quantity to remove substantially all said hydrogen sulfide from said gas stream, notwithstanding variations in the stoichiometric balance between said hydrogen sulfide and said sulfur dioxide in said reaction medium with said gas stream in the presence of sulfur dioxide in the reaction medium to react with the hydrogen sulfide at a temperature above the melting point of sulfur to form liquid sulfur, in accordance with the equation:

$$2H_2S+SO_2 \rightarrow 3S+2H_2O$$

in a upper region of a reactor;
  accumulating liquid sulfur from said reaction as a layer in a lower region of said reactor below said reaction medium;
  venting a hydrogen sulfide depleted gas stream from said reactor; and
  removing liquid sulfur from the layer thereof,
  wherein sulfur dioxide is passed upwardly through said layer of liquid sulfur to remove dissolved components therefrom and then said reaction medium to provide therein said sulfur dioxide for reaction with the hydrogen sulfide.

4. The process of claim 3, which is carried out on a sour natural gas stream and wherein:
  the sour natural gas stream is passed to said reactor;
  said sour natural gas stream is dispersed in said reactor; and
  the resulting sweetened gas stream is removed from the reactor as said vented gas stream.

5. The process of claim 4 wherein said sour gas stream first is heated to at least the melting point of sulfur and then passed to said reactor.

6. A continuous process for the removal of hydrogen sulfide from a sour natural gas stream, which comprises:
  contacting a reaction medium comprising a single non-aqueous Lewis base which is quinoline and having the capacity to absorb sulfur dioxide in sufficient quantity to remove substantially all said hydrogen sulfide from said gas stream, notwithstanding variations in the stoichiometric balance between said hydrogen sulfide and said sulfur dioxide in said reaction medium with said gas stream in the presence of sulfur dioxide in the reaction medium to react with the hydrogen sulfide at a temperature above the melting point of sulfur to form liquid sulfur, in accordance with the equation:

$$2H_2S+SO_2 \rightarrow 3S+2H_2O$$

in an upper region of a reactor;
  accumulating liquid sulfur from said reaction as a layer in a lower region of said reactor below said reaction medium;
  venting a sweetened gas stream from said reactor; and
  removing liquid sulfur from the layer thereof,
  wherein sulfur dioxide is passed upwardly through said layer of liquid sulfur to remove dissolved components therefrom and then said reaction medium to provide therein said sulfur dioxide for reaction with the hydrogen sulfide wherein said sour gas stream is dispersed in said layer of liquid sulfur and the dispersed gas stream is permitted to pass upwardly through the layer of liquid sulfur and into direct contact with said reaction medium containing sulfur dioxide in a quantity at least sufficient to convert substantially all the hydrogen sulfide in said gas stream to sulfur.

7. A continuous process for the removal of hydrogen sulfide from a sour natural gas stream, which comprises:
  contacting a reaction medium comprising a single non-aqueous Lewis base which is quinoline and having the capacity to absorb sulfur dioxide in sufficient quantity to remove substantially all said hydrogen sulfide from said gas stream, notwithstanding variations in the stoichiometric balance between said hydrogen sulfide and said sulfur dioxide in said reaction medium with said gas stream in the presence of sulfur dioxide in the reaction medium to react with the hydrogen sulfide at a temperature above the melting point of sulfur to form liquid sulfur, in accordance with the equation:

$$2H_2S+SO_2 \rightarrow 3S+2H_2O$$

in an upper region of a reactor;
  accumulating liquid sulfur from said reaction as a layer in a lower region of said reactor below said reaction medium;
  venting a sweetened gas stream from said reactor; and
  removing liquid sulfur from the layer thereof,
  wherein sulfur dioxide is passed upwardly through said layer of liquid sulfur to remove dissolved components therefrom and then said reaction medium to provide therein said sulfur dioxide for reaction with the hydrogen sulfide,
  wherein said sour gas stream first is heated to at least the melting point of sulfur and then passed to said reactor, and wherein said heating of sour gas stream to said temperature is effected, at least in part, by passing the same in heat exchange relationship with said removed sweetened gas stream, which thereby effects said cooling of the removed sweetened gas stream.

8. A continuous process for the removal of hydrogen sulfide from a sour natural gas stream, which comprises:

contacting a reaction medium comprising a single non-aqueous Lewis base which is quinoline and having the capacity to absorb sulfur dioxide in sufficient quantity to remove substantially all said hydrogen sulfide from said gas stream, notwithstanding variations in the stoichiometric balance between said hydrogen sulfide and said sulfur dioxide in said reaction medium with said gas stream in the presence of sulfur dioxide in the reaction medium to react with the hydrogen sulfide at a temperature above the melting point of sulfur to form liquid sulfur, in accordance with the equation:

$$2H_2S + SO_2 \rightarrow 3S + 2H_2O$$

in an upper region of a reactor;

accumulating liquid sulfur from said reaction as a layer in a lower region of said reactor below said reaction medium;

venting a sweetened gas stream from said reactor; and removing liquid sulfur from the layer thereof, wherein sulfur dioxide is passed upwardly through said layer of liquid sulfur to remove dissolved components therefrom and then said reaction medium to provide therein said sulfur dioxide for reaction with the hydrogen sulfide wherein the removed sweetened gas stream is cooled to remove condensables therefrom and the resulting cooled sweetened gas stream is recovered as the product of the process.

9. The process of claim 8 wherein said condensables are collected and comprise condensed non-aqueous Lewis base and dissolved sulfur and the collected condensables are recycled to said reactor.

10. The process of claim 9 wherein reaction medium is recycled within the reactor by blending a stream of reaction medium from the reactor with the collected condensables and recycling the blend to the reactor.

11. The process of any one of claims 3 to 10 wherein said reaction is carried out at a temperature of about 120° to about 155° C.

12. A method for the removal of hydrogen sulfide from a gas stream, which comprises:

passing said gas stream into a body of regenerable reaction medium comprising a single non-aqueous Lewis base which is quinoline and having the capacity to absorb sulfur dioxide in sufficient quantity to remove substantially all said hydrogen sulfide from said gas stream, notwithstanding variations in the stoichiometric balance between said hydrogen sulfide and said sulfur dioxide in said reaction medium and containing a reaction product of sulfur dioxide and the non-aqueous Lewis base to absorb the hydrogen sulfide from the gas stream and to react the absorbed hydrogen sulfide with sulfur dioxide from the reaction product in accordance with the equation:

$$2H_2S + SO_2 \rightarrow 3S + 2H_2O$$

to form product sulfur in a reactor;

venting a hydrogen sulfide depleted gas stream from an upper portion of the reactor above the reaction medium and permitting said product sulfur to settle to a lower portion of the reactor;

detecting exhaustion of the capacity of the body of reaction medium to absorb and convert hydrogen sulfide to sulfur; and replacing the body of spent reaction medium with regenerated reaction medium containing the reaction product.

13. The method of claim 12 wherein said regenerated reaction medium is formed by in situ reaction of spent reaction medium with sulfur dioxide.

* * * * *